May 15, 1923.
L. DE MATTEO
CIGAR CUTTER
Filed April 4, 1921
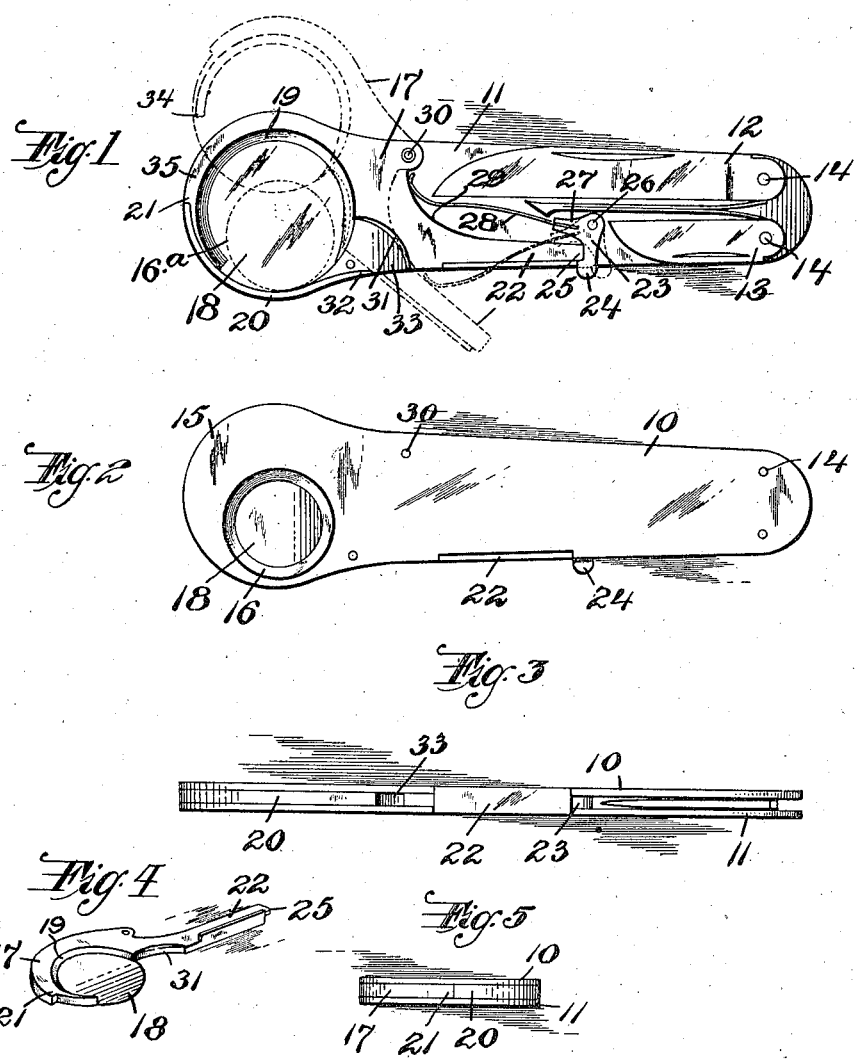
INVENTOR.
Lewis De Matteo,
BY
Wm H Caufield.
ATTORNEY Patented May 15, 1923.

1,454,994

UNITED STATES PATENT OFFICE.

LEWIS DE MATTEO, OF NEWARK, NEW JERSEY, ASSIGNOR TO DURAND & COMPANY, OF NEWARK, NEW JERSEY.

CIGAR CUTTER.

Application filed April 4, 1921. Serial No. 458,206.

*To all whom it may concern:*

Be it known that I, LEWIS DE MATTEO, a citizen of the United States, and a resident of Newark, county of Essex, and State of New Jersey, have invented certain new and useful Improvements in Cigar Cutters, of which the following is a specification.

This invention relates to an improved cigar cutter which is ornamental and is easily operable, which is kept closed without danger of accidental opening while being carried in the pocket, and is one that is substantially flat, thereby making it very well adapted for pocket use and is also constructed so that it can be easily cleaned and small pieces of tobacco or tobacco dust are not apt to lodge in the cutter, and if they do they can be easily shaken out, since the construction of the device is such as to make this possible.

The invention is illustrated in the accompanying drawing, in which Figure 1 is a side view with one of the cheek pieces removed. Figure 2 is a side view of the device complete. Figure 3 is a bottom view. Figure 4 is a perspective view, on a reduced scale, of the cutter and its blade, and Figure 5 is an end view of the cutter.

The main portion or handle portion is made up of two cheek pieces 10 and 11 which are preferably elongated to form a handle which, in addition to its use as a handle, can also act as a casing for implements, for instance, the blades 12 and 13 such as are used in an ordinary pen-knife and which swing on the pivots 14, which can also act as rivets to hold the cheek pieces together, as will be evident. The end of the handle is enlarged and made substantially circular to form eyes, as at 15, these having aligned openings, as 16 in the cheek piece 10 and 16ª in the cheek piece 11, which permit the placing of the end of a cigar when the cutter or blade is open.

The cutter 17 is provided at one end with a blade 18, this blade being much thinner than the cutter and being usually made from a piece of metal set in on one edge so that it will shear against the edge of one of the openings, in the illustration this being the opening 16ª. The back edge of the blade 18 is set in the cutter, the metal adjacent to the cutter being preferably chamfered, as at 19, so that the blade part of the cutter is a depressed part forming a narrow flat chamber between the blade and the cheek piece 10.

A guard 20 is placed at the bottom in the space between the cheek pieces, the end of this guard being engaged by a shoulder 21 on the outer end of the cutter so as to form a closure when the cutter is shut, as will be seen from Figures 1 and 5. At the front of the cutter, on the end opposite the blade, is a handle 22, and at the end of the handle is arranged a latch 23, which latch is preferably L-shaped and has a nose 24 on the end of one of its arms to engage the shoulder 25 on the end of the handle 22, the latch being pivoted, as at 26, and having its arm 27 clamped to securely hold one end of a spring 28, which spring extends forwardly and engages the curved back 29 of the cutter.

The cutter is hinged intermediate of its ends and near the back, as at 30, the pin 30 also acting as a rivet to hold the parts together, the cutter being recessed, as at 31, at its front edge so as to form a space between the recess 31 and the end 32 of the guard 20, thus forming an opening 33. The opening 33 permits the escape of small particles of material which might be deposited in the shallow chamber between the blade 18 and the cheek piece 10, this opening being very clearly seen from Figures 1 and 3.

If some material can not be easily discharged through the opening 33, the blade can be opened, as shown in dotted outline in Figure 1, then the open space between the cheek pieces, from the edge 34 of the cutter to the end of the guard 20, forms an opening at 35 through which material can be shaken out.

The operation of the device is simple, since when the cutter is held in the hand a finger is used to press back on the nose 24, which not only releases the shoulder 25, but increases the tension on the spring 28 so that it snaps the cutter open and the cutter assumes the position shown in Figure 1, or a more open position, as will be readily understood. When the cutting is done, which, of course, is by again swinging the handle 22 inward, the spring 28 is swung up, but is not yet under a tension because the latch 23 can easily swing until the handle 22 is nearly shut, and then the engagement of the latch with the end of the handle causes the spring 28 to be placed under a tension and the latch snapped shut over the shoulder 25 of the handle.

It will thus be seen that with the tension on the spring increasing as the latch is swung to an open position, this permits the use of a latch spring which is not subjected to any undue strain and which is under any increased strain such a short time that its liability to break is very slight.

I claim:

1. A device of the kind described comprising cheek pieces having at one end aligned openings, a cutter pivoted at its rear edge and swinging between the cheek pieces, the cutter having a handle at its front edge, said handle lying close to the edge of the cheek pieces when the cutter is shut, a latch swinging between the cheek pieces and projecting slightly therefrom, a spring secured to the latch and bearing on the rear edge of the cutter, and a blade on the cutter to shear against the edge of one of the openings.

2. A device of the kind described comprising cheek pieces forming a body portion and spaced apart and having substantially circular ends and having aligned openings, a cutter pivoted at its rear edge between the cheek pieces and having a thin central portion to form a blade to shear across one of said openings, a shield along the bottom and part way up the end of the cheek pieces, the cutter having a shoulder to engage one end of the shield when the cutter is shut, the cutter also having a recessed part opposite the other end of the shield, and a spring-pressed latch to engage the cutter.

In testimony that I claim the foregoing, I have hereto set my hand, this 2nd day of April, 1921.

LEWIS DE MATTEO.